Nov. 24, 1964     L. D. DUNN     3,158,360
MIXER
Original Filed Nov. 5, 1959
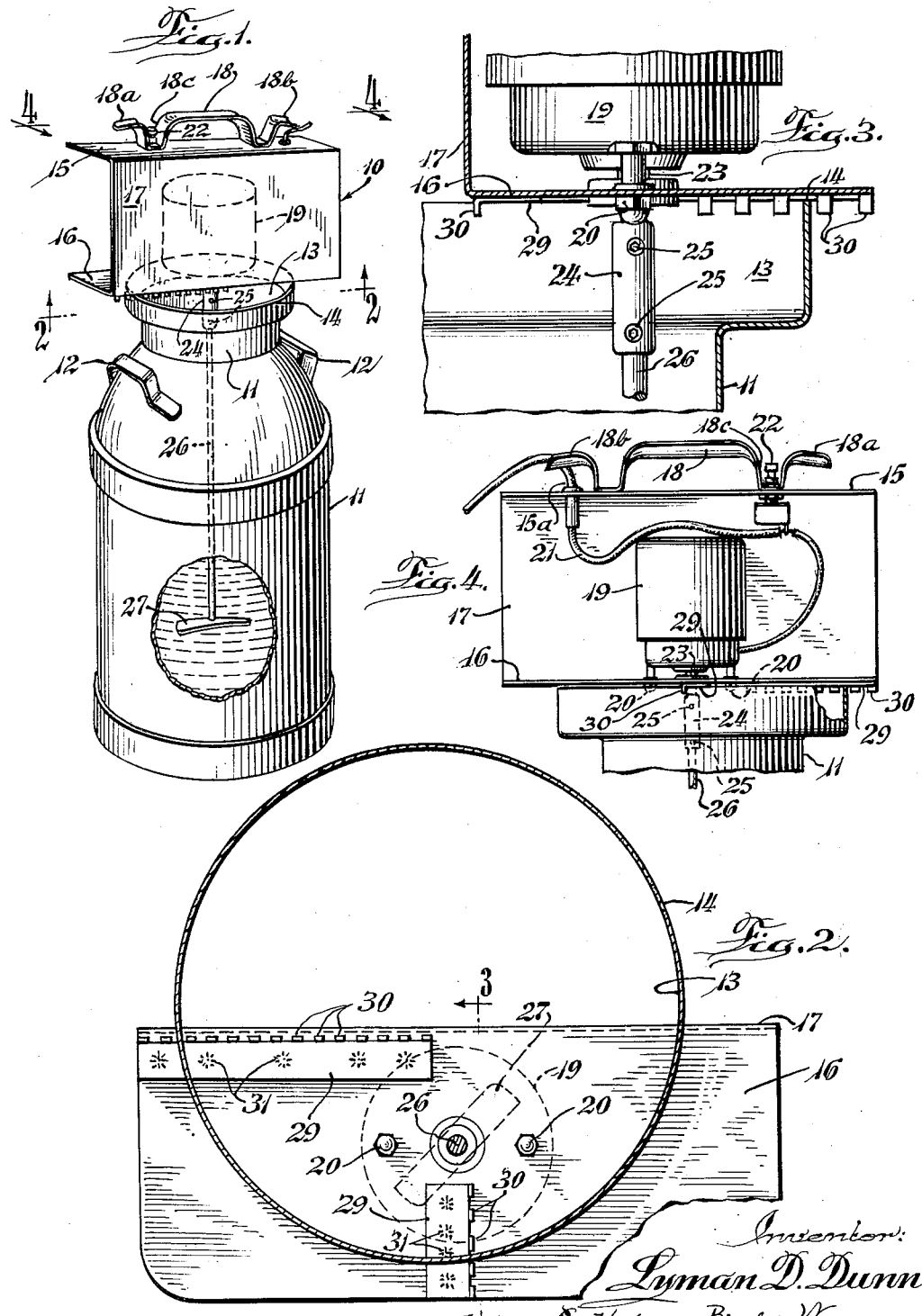
Inventor:
Lyman D. Dunn
By Hofgren, Brady, Wegner
Allen & Stellman Attorneys

United States Patent Office 3,158,360
Patented Nov. 24, 1964

3,158,360
MIXER
Lyman D. Dunn, 60 E. 25th St., Chicago, Ill.
Continuation of application Ser. No. 851,084, Nov. 5, 1959. This application Dec. 3, 1962, Ser. No. 243,702
3 Claims. (Cl. 259—135)

This invention relates to a mixer and more particularly to a mixer which is adapted to be automatically positioned on a mixing container for mixing operations.

This application is a continuation of my copending application Serial No. 851,084 filed November 5, 1959 and now abandoned.

Solid materials are quite commonly mixed into liquids to provide solutions of materials for use in manufacturing operations and the like. Quite commonly the solid material is added to the liquid and then beaten with a mechanical mixer to provide the proper solution or mixture. The use of such mixers, however, has commonly presented a problem if the mixing is to take place in a container or the like since the mixer normally has to be rigidly attached to the container during mixing operations. Further, once the mixers are attached, it is often difficult to introduce the solid material into the liquid to increase its concentration. These problems are overcome by the mixer of this invention which is adapted to automatically grip the mouth of a mixing container to fasten the mixer thereon in a substantially vibrationless manner for mixing operations. Further, the mixer of this invention is so constructed that it may be seated on the mouth of a mixing container without completely covering the mouth thereby providing an opening for introducing additional solid materials and the like.

It is, therefore, an object of this invention to provide a mixer of the character described in the paragraph above.

It is a further object of this invention to provide such a mixer which has fastening means located on the body thereof adapted to solidly and frictionlessly hold the mouth of a mixing container after random disposition of said mixer thereover.

It is yet another object of this invention to provide such a mixer which has a vertically disposed side which is positioned immediately adjacent the uncovered portion of the mouth of the mixing container when the mixer is in position, and is adapted to provide a sideboard for loading the container.

It is still another object of this invention to provide a mixer which has a mixer body having mixing means and means for driving the mixing means positioned thereon, and fastening means on the body, the fastening means being adapted to automatically grip the mouth of a mixing container in spaced areas thereon to fasten the mixer to the container without completely covering the mouth of the container in a substantially vibrationless manner for mixing operations.

Other objects and advantages of this invention will become apparent from the following description taken together with the accompanying drawings.

Of the drawings:

FIGURE 1 is a perspective view partially broken away of the mixer of this invention in place on a mixing container;

FIGURE 2 is an enlarged sectional view taken along the line 2—2 of FIGURE 1;

FIGURE 3 is an enlarged partial sectional view taken along the line 3—3 of FIGURE 2; and FIGURE 4 is a view taken along the line 4—4 of FIGURE 1.

Referring now to FIGURE 1, a mixer 10 is shown therein in place on a mixing container 11. The particular type of mixing container 11 shown is one customarily referred to as a milk can. The container has a pair of handles 12 and a mouth or loading aperture 13 which is defined by the lips 14.

The mixer of this invention includes a body having a top 15, a bottom 16 and a vertically disposed side 17. A handle 18 is welded or riveted to the top 15. The handle is provided with a thumb rest 18a and a wire protecting portion 18b. A conventional electric motor 19 is located in the central portion of the bottom 16 and is held in that position by screws 20 which pass through the bottom 16 into the motor base. An electric wire 21 emanates from the motor 19 and passes through an aperture 15a in the top 15 under the handle protector 18b. A conventional power interrupting switch 22 is located in the U-shaped portion 18c of the handle 18 and is in electrical contact with the wire 21. This switch 22 may be operated by the thumb of the party using the mixer.

The drive shaft 23 of the motor 19 passes through the bottom 16 of the mixer body. The shaft is provided with a sleeve coupling 24, the upper portion of which is held on the drive shaft by a set screw 25. The lower portion of the sleeve 24 is designed to accept a stirrer rod 26 which is seated therein by a second set screw 25. Attached to the lower portion of the stirrer rod 26 is a mixing blade 27 of conventional construction. The length of the stirrer rod 26 is variable depending upon the volume of the mixing container to be used. The coupling 24 and set screw 25 allow rapid changes of the stirrer rods to accommodate various containers.

In order to attach the mixer 10 to the mixing container 11, a pair of members 29 having rows of teeth 30 are welded as at 31 to the bottom 16 of the mixer body. The members 29 are disposed substantially normally to each other so that the teeth 30 may grip the lips or periphery 14 of the container mouth 13, as can be seen in FIGURE 2. Thus, in order to obtain an attachment to the container 11, the mixer 10 is merely set on the mouth 13 of the container 11 so that the lip 14 is located between a pair of teeth 30 on each of the members 29. This provides substantially frictionless attachment of the mixer to the container for mixing operation. Further, since there are a plurality of teeth 30, there are innumerable positions and mouth sizes which can be accommodated by this attaching means.

The vertical side wall 17 of the body also provides a function of acting as a loading sideboard since the mixer body 10 does not entirely cover the mouth 13 of the container 11. Materials may be introduced into the container during mixing operations. It is often considered difficult to do this unless some kind of sideboard is provided against which the materials may be dumped. Such a sideboard is provided by the side wall 17 of the mixer body.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A mixer of the character described designed for use in performing mixing operations on ingredients in a mixing container having a substantially vertically disposed loading mouth, comprising: a mixer body having a bottom; mixing means and means for driving said mixing means positioned on said body, with said driving means being located closely adjacent said bottom whereby said body has a relatively low center of gravity; and fastening means comprising two rows of downwardly extending teeth having relatively long flanks positioned on said body bottom and disposed substantially at right angles to each other, so that the mouth of said mixing container can be solidly held at spaced areas thereon after random disposal of said mixer thereover to fasten said mixer to said container and support it thereon in a substantially vibrationless manner for mixing operations.

2. A mixer of the character described designed for use in performing mixing operations on ingredients in a mixing container having a substantially vertically disposed loading mouth, comprising: a mixer body having a bottom and a substantially vertically disposed side; mixing means and means for driving said mixing means positioned on said body, with said driving means being located closely adjacent said bottom whereby said body has a relatively low center of gravity; and two rows of downwardly extending teeth having relatively long flanks positioned on said body bottom and disposed substantially normal to each other, in which the mouth of said mixing container can be solidly held at spaced areas thereon after random disposal of said mixer thereover to fasten said mixer to said container without completely covering said mouth in a substantially vibrationless manner for mixing operations, said side being positioned immediately adjacent the uncovered portion of said mouth to provide a sideboard for loading said container.

3. A mixer of the character described designed for use in performing mixing operations on ingredients in a mixing container having a substantially vertically disposed loading mouth, comprising: a mixer body having a bottom and a substantially vertically disposed side; mixing means and means for driving said mixing means positioned on said body, with said driving means being located closely adjacent said bottom whereby said body has a relatively low center of gravity; and a pair of rows of teeth positioned on said body bottom and disposed substantially normal to each other, said teeth having relatively long flanks disposed substantially normal to said mixer bottom with the spacing between adjacent teeth being substantially equal to the length of one of said flanks and the bottom of the notches between a pair of teeth is substantially normal to said flanks whereby the mouth of said mixing container can be solidly held in the notches between said teeth at at least two spaced areas along the periphery thereof after random disposal of said mixer thereover to fasten said mixer to said container in a substantially vibrationless manner without completely covering said mouth for mixing operations, said side being positioned immediately adjacent the uncovered portion of said mouth to provide a sideboard for loading said container.

References Cited in the file of this patent
UNITED STATES PATENTS

| | | |
|---|---|---|
| 1,698,402 | Harris | Jan. 8, 1929 |
| 2,137,921 | Matthews | Nov. 22, 1938 |
| 2,736,536 | Banowitz | Feb. 28, 1956 |
| 2,745,644 | Von Behren | May 15, 1956 |
| 3,011,768 | Clark | Dec. 5, 1961 |

FOREIGN PATENTS

| | | |
|---|---|---|
| 526,126 | France | Oct. 1, 1921 |